United States Patent [19]
Ambroise et al.

[11] Patent Number: 5,500,265
[45] Date of Patent: Mar. 19, 1996

US005500265A

[54] PEELABLE FILM STRUCTURE

[75] Inventors: Benoit Ambroise, Brandeville; Maurice Petitjean, Williers, both of France

[73] Assignee: Mobil Oil Corporation, Fairfax, Va.

[21] Appl. No.: 133,715

[22] Filed: Oct. 7, 1993

[30] Foreign Application Priority Data

Jul. 21, 1993 [GB] United Kingdom ............ 9315122

[51] Int. Cl.$^6$ .......... B32B 27/08; B32B 27/34; B32B 27/36; B28B 3/20
[52] U.S. Cl. .......... 428/41; 428/349; 428/516; 428/518; 428/520; 428/910; 264/176.1
[58] Field of Search .......... 428/520, 516, 428/910, 349, 41, 518; 264/176.1

[56] References Cited

U.S. PATENT DOCUMENTS

| | | | |
|---|---|---|---|
| 3,719,629 | 3/1973 | Martin et al. | 260/33.2 EP |
| 4,448,792 | 5/1984 | Schirmer | 426/113 |
| 4,564,558 | 1/1986 | Touhsaent et al. | 428/349 |
| 4,564,559 | 1/1986 | Wagner et al. | 428/349 |
| 4,604,324 | 8/1986 | Nahmias et al. | 428/349 |
| 4,720,427 | 1/1988 | Clauson et al. | 428/349 |
| 4,759,984 | 7/1988 | Hwo | 428/349 |
| 4,794,136 | 12/1988 | Touhsaent | 524/512 |
| 4,931,327 | 6/1990 | Liu et al. | 428/36.5 |
| 4,944,990 | 7/1990 | Liu et al. | 428/353 |
| 5,019,315 | 5/1991 | Wilson | 264/171 |
| 5,075,157 | 12/1991 | Hwo et al. | 428/216 |
| 5,093,194 | 3/1992 | Touhsaent et al. | 428/349 |
| 5,151,317 | 9/1992 | Bothe | 428/216 |
| 5,178,942 | 1/1993 | Frognet et al. | 428/317.9 |

FOREIGN PATENT DOCUMENTS

0546741A1 of 0000 European Pat. Off. .

*Primary Examiner*—P. C. Sluby
*Attorney, Agent, or Firm*—Alexander J. McKillop; Dennis P. Santini; Laurence P. Hobbes

[57] ABSTRACT

A peelable film comprising: (A) a core layer comprising an olefin polymer; (B) a skin layer on at least one surface of the core layer, the skin layer comprising: (i) a blend of a butylene polymer with another olefin polymer; or (ii) a polymer of butylene and at least one other olefin; and (C) a coating layer on the skin layer.

22 Claims, No Drawings

PEELABLE FILM STRUCTURE

FIELD OF THE INVENTION

This invention relates to the field of polymer films, and, more particularly, to a peelable film having an oriented core layer.

BACKGROUND OF THE INVENTION

In the packaging of certain types of foods, such as snack foods like potato chips, cookies and the like, it is common practice to employ a multi-layer film. A desirable property in such a packaging film is its opacity which serves to protect the packaging and the product contained therein from deterioration caused by exposure to light. In particular, it has been found that when the package is exposed to certain wavelengths of light, increased spoilage in some packaged products results. Thus, the degree of opacity which is present in the film has been found to be a significant parameter, because it has been found that spoilage of the contents of the package occurs even if the film allows the passage of only some light.

It is known in the art that thermoplastic polymers can be loaded with inert fillers, cast into films, and thereafter stretched to form opaque, oriented thermoplastic films. While this statement is generally true, it should be realized that fulfilling this depends on the particular components employed in formulating the filled film, and on the specific process parameters employed.

In U.S. Pat. Nos. 3,697,367 and 3,795,720, there are disclosed processes for preparing uniaxially oriented mixed polymer systems. The resulting material has utility for being formed into fibers, which can in turn be used for making sheet form material, like paper.

Oriented opaque film compositions are generally known in the art. U.S. Pat. No. 4,377,616 discloses an opaque biaxially oriented polymer film structure comprising a thermoplastic polymer matrix core possessing numerous voids, a substantial number of which contain at least one spherical void-initiating particle. This polymer film structure also comprises transparent thermoplastic skin layers adhering to the surfaces of the core layer. The unique structure of the core layer disclosed in this patent is said to impart a much higher degree of opacity than that which has been found to be possible from the use of an opacifying pigment alone. This is possibly due to the effects of light scattering.

This patent discloses the preparation of a film by melting a mixture of a major proportion of a film forming, first polymer, such as a polypropylene, and a minor proportion of a second polymer, which is incompatible with the first polymer and which has a higher melting point than the first polymer. The mixture is brought to a temperature sufficiently high to melt the incompatible polymer and to disperse it in the film forming first polymer. The melted dispersion mixture is then extruded into a film and biaxially oriented in the conventional manner. Upon solidification in film form, the dispersed incompatible polymer particles provide sites for the formation of voids surrounding these polymer particles which are created during orientation. These voids provide opacity and give the film an attractive pearlescent sheen.

U.S. Pat. No. 4,533,509 discloses a composite oriented structure having at least one thin surface layer containing highly subdivided inorganic material in a proportion which is suited to providing antiblock properties and to reducing the coefficient of friction of the product. The thin surface layer is formed simultaneously or sequentially on a comparatively thick base polymer layer and the composite is thereafter oriented.

U.S. Pat. No. 4,632,869 discloses an opaque, biaxially oriented film structure comprising a polymer matrix with a stratum of voids. The voids contain spherical, void-initiating particles of polybutylene terephthalate. The structure may also include thermoplastic skin layers and may include from about 1% to 3% by weight of a pigment, such as white $TiO_2$, or colored oxides.

U.S. Pat. No. 4,652,489 discloses an oriented, sealable, opaque polyolefin multilayer film comprising: a core layer containing vacuoles, a sealable surface layer, and a non-sealable surface layer which incorporates a slip agent such as a polydiorganosiloxane.

U.S. Pat. No. 4,741,950 discloses a differential opaque polymer film with a core layer containing numerous microscopic voids, a first wettable skin layer, which has a rough appearance, and which contains an antiblocking agent, such as: silica, a silicate, clay, diatomaceous earth, talc and/or glass; and a second wettable skin layer, which has a smooth appearance and which may be metallized. $TiO_2$ may be present in the core and/or the first skin layer. The film allows a light transmission of 24%.

U.S. Pat. No. 4,758,462 also discloses an opaque, biaxially oriented film with a cavitated core and transparent skin layers. Colored, light absorbing pigments, such as carbon black or iron oxide, are added to the core and/or the skins in an amount of about 2 to 12 weight per cent to decrease light transmission through the film.

In packaging of all types, there is a need for film which can securely package articles, especially food, and which at the same time is easy to open. Although not restricted to food items such as candy, cakes, fast foods or the like, it is particularly important to the food industry to have facilely openable packaging. Such packaging can be provided by using peelable films. As may be readily appreciated, no matter what is packaged, the consumer does not want to have to struggle with the packaging.

Therefore, there is a need for a film structure of for use in food packaging or the like which is easy to open by virtue of its peelable characteristics.

SUMMARY OF THE INVENTION

In accordance with the present invention, there is provided a peelable film comprising: a core layer comprising an olefin polymer; a skin layer on at least one surface of the core layer, the skin layer comprising: a blend of a butylene polymer with another olefin polymer, or a polymer of butylene and at least one other olefin; and a coating layer on the skin layer.

Advantageously the core layer is an oriented olefin polymer, preferably a biaxially oriented olefin polymer.

Therefore, it is an object of the present invention to provide an improved peelable film.

DETAILED DESCRIPTION OF THE INVENTION

Preferably the core layer is cavitated as disclosed in our EP-A-0083495. The core layer may be as described in European Patent No. 258020, i.e., a voided core layer comprising a matrix of a thermoplastic polymeric material in which is dispersed void initiating solid particles which are phase distinct from the thermoplastic polymeric material of the matrix and about which particles are located opacifying voids and a minor amount of a light absorbing pigment.

It is particularly preferred that the core layer is isotactic polypropylene, but the core layer may instead be high density polyethylene.

When the skin layer is a blend it is preferably one of: a blend of polybutylene with polyethylene; a blend of polybutylene with polypropylene, a blend of polybutylene with a polypropylene copolymer; or a blend of polybutylene with a polypropylene terpolymer.

The polyethylene may comprise high density polyethylene, medium density polyethylene, low density polyethylene, linear low density polyethylene; or a copolymer of ethylene with polar monomers such as vinyl acetate or methyl acrylate.

When the skin layer is a polymer of butylene and at least one other olefin, it preferably comprises a copolymer of butylene and propylene.

The coating layer is preferably a heat-sealable polymer. The heat-sealable polymer is preferably an acrylic polymer or polyvinylidene chloride.

Advantageously there is a primer for the coating provided between the skin layer and the coating layer. The primer improves the adhesion of the coating layer to the skin layer, but does not inhibit peelability. The nature of the primer will depend on the coating layer utilized: aqueous polyethyleneimine solution based primers may be used for acrylic coating layers while water-dispersed epoxy resin-based primers may be used for vinylidene chloride polymer coating layers or acrylic coating layers. Polyethylene imine, or a blend of polyethylene imine and epoxy resin can also be used for acrylic based coating layers.

Thus the primers may comprise the reaction product of an epoxy resin and an acidified aminoethylated vinyl polymer. The contemplated epoxy resins are glycidyl ethers of polyhydroxy compounds. Typical polyhydroxy compounds which may be used include bisphenol A, ring substituted bisphenol A, resorcinol, hydroquinone, phenol-formaldehyde novolac resins, aliphatic diols, such as ethylene glycol, propylene glycol, 1,4-butanediol, 1,6-hexanediol, glycerol, lower alkyl hydantoins or mixtures thereof.

The preferred epoxy resins of the present invention are those made by the glycidation reaction between epichlorohydrin and bisphenol A. Epoxy resins of this type are commonly classified by their epoxy equivalent weight (EEW) which is defined as the weight of resin in grams which contains one gram equivalent of epoxy resins. Resins with an EEW ranging from 170 to 280 may be used in the present invention, but the preferred range is 180 to 210.

A variation in the composition of the epoxy resin component is one in which a hydantoin compound is substituted for the bisphenol A. For example, 1,1-dimethyl hydantoin may be employed in a lower molecular weight epoxy resin since resins based on this material are completely water soluble thereby eliminating the necessity for emulsification.

Although the specific structure of the epoxy resin is not critical to the primer employed in the present invention, important considerations in the selection of the epoxy resin revolve around its physical state. For example, it must be liquid and capable of being readily dispersed or dissolved with the second component or curing agent as described hereinbelow. If the epoxy resin is of low viscosity, it may be stirred directly into the second component, i.e., curing agent, however, it is preferred to employ the epoxy resin in an aqueous emulsion.

The second component in the epoxy primer compositions of the present invention is an amino modified acrylic polymer which is water soluble. This polymer is a curing agent for the epoxy compound. The preferred material is described in U.S. Pat. No. 3,719,629 and may be generically described as an acidified aminoethylate interpolymer having pendant aminoalkylate groups. This material is produced by polymerizing acrylate, methacrylate, styrene or other suitable monomers with sufficient methacrylic or acrylic acid to give a —COOH content of 7.5 to 12.5%. Solvent polymerization techniques are preferred. The polymer is then reacted with ethyleneimine monomer and acidified with hydrochloric acid to render the polymer water soluble.

The primer may also comprise a poly(ethylene imine). The imine primer provides an overall adhesively active surface for thorough and secure bonding with the subsequent applied heat seal composition. It has been found that an effective coating solution concentration of the poly(ethylene imine) applied from either aqueous or organic solvent media, such as ethanol, is a solution comprising 0.1–0.6% by weight of the poly(ethyleneimine). A commercially available material of this type is known as Polymin M, a product of BASF-Wyandotte Corp.

The surface of the skin layer which receives the coating layer can be subjected to a surface modifying treatment by corona discharge, flame or oxidizing chemicals. Preferably the surface is treated by flame or corona to a surface activity of at least 36 dynes/cm (36 mN/m), preferably to approximately 40 dynes/cm (40mN/m).

The polybutylene is preferably present in the skin layer in an amount from 5 to 50 wt. %, more preferably 10 to 30 wt. %. When the skin layer is a polymer of butylene with at least one other olefin, then the butylene content of the polymer is preferably present in the skin layer in an amount from 5 to 50 wt. %, more preferably 10 to 30 wt. %.

The polypropylene copolymer is suitably a copolymer of ethylene and propylene or of butylene and propylene. Particularly preferred copolymers are ethylene-propylene copolymers containing from 1 to 30 wt. %, preferably from 2 to 7 wt. %, more preferably 3 to 5 wt. %, ethylene and having a melt flow rate at 230° C. ranging from 2 to 15, more preferably 3 to 8, a crystalline melting point in the range 125 to 150° C., a number average molecular weight range from 25000 to 100000, and a density from 0.89 to 0.90. Preferred copolymers of butylene and propylene contain up to 30 wt. % butylene.

The polypropylene terpolymer is suitably a terpolymer of ethylene, propylene, and butylene containing from 1 to 10, and preferably from 2 to 6, wt. % ethylene, from 80 to 97, and preferably from 88 to 95, wt. % propylene, and from 1 to 20, and preferably from 2 to 15, wt. % butene-1.

In one embodiment the skin and coating layers are provided on both surfaces of the core layer.

According to another aspect of the present invention there is provided a method of making a peelable film comprising coextruding a core layer comprising an olefin polymer with a skin layer comprising either: (i) a blend of a butylene polymer with another olefin polymer; or (ii) a polymer of butylene and at least one other olefin; and coating said skin layer with a coating layer comprising a heat-sealable polymer.

The core layer is preferably coextruded with the skin layer and then is desirably biaxially oriented. The polymers can be brought to the molten state and coextruded from a conventional extruder through a flat sheet die, the melt streams being combined in an adaptor prior to being extruded from the die. After leaving the die orifice, the multi-layer film structure is chilled and the quenched sheet is then preferably reheated and stretched, e.g., 4 to 6 times in the machine direction at approximately 250° F. (121° C.) and subsequently, for example, 8 to 10 times in the transverse direction at approximately 320° F. (160° C.).

The peelable film according to the invention is advantageously used in packaging for articles, such as food, imparting a good appearance (low haze and high gloss), high aroma barrier, and excellent surface properties such as low coefficient of friction and good printability.

The peelable film according to the present invention has superior peelability to peelable film in the prior art. In particular the film peels between the coating layer and the skin layer, rather than between the core layer and the skin layer.

Although the present invention has been described and exemplified with respect to preferred embodiments, it is to be understood that modifications and variations may be utilized without departing from the spirit and scope of this invention. Such modifications and variations are considered to be within the purview and scope of this invention.

What is claimed is:

1. A peelable film comprising:
   (a) a core layer comprising an olefin polymer;
   (b) a skin layer on at least one surface of the core layer, consisting essentially of:
      (i) a blend of a butylene polymer with another olefin polymer; or
      (ii) a polymer of butylene with one other olefin; and
   (c) a coating layer comprising a heat-sealable polymer on the skin layer, said peelable film being peelable between said coating layer and said skin layer.

2. A peelable film according to claim 1, wherein the core layer is an oriented olefin polymer.

3. A peelable film according to claim 2, wherein said core layer is a biaxially oriented olefin polymer.

4. A peelable film according to claim 3, wherein said core layer contains opacifying voids.

5. A peelable film according to claim 3, wherein said core layer consists essentially of isotactic polypropylene.

6. A peelable film according to claim 3, wherein said core layer consists essentially of high density polyethylene.

7. A peelable film according to claim 1, wherein the skin layer is selected from the group consisting of a blend of polybutylene with polyethylene; a blend of polybutylene with polypropylene; a blend of polybutylene with a polypropylene copolymer; and a blend of polybutylene with a polypropylene terpolymer.

8. A peelable film according to claim 7, wherein the polypropylene copolymer is a copolymer consisting of ethylene with propylons or of burylens with propylene.

9. A peelable film according to claim 7, wherein the polypropylene terpolymer is a terpolymer of ethylene, propylene, and butylene.

10. A peelable film according to claim 7, wherein the polyethylene is a member selected from the group consisting of high density polyethylene, medium density polyethylene, low density polyethylene, linear low density polyethylene and a copolymer of ethylene with a polar monomer.

11. A peelable film according to claim 1, wherein the skin layer comprises a copolymer of propylene with butylene.

12. A peelable film according to claim 1, wherein there is a primer for the coating provided between the skin layer and the coating layer.

13. A peelable film according to claim 1, wherein the heat-sealable polymer comprises an acrylic polymer or polyvinylidene chloride.

14. A peelable film according to claim 1, wherein the skin and coating layers are provided on both surfaces of the core layer.

15. A peelable film according to claim 1, wherein when the skin layer is a blend, the polybutylene is present in the skin layer in an amount from 5 to 50 wt. %.

16. A peelable film according to claim 1, wherein when the skin layer is a blend, the polybutylene is present in the skin layer in an amount from 10 to 30 wt. %.

17. A peelable film according to claim 1, wherein when the skin layer is a polymer of butylene and at least one other olefin, the butylene content of the polymer is from 5 to 50 wt. %.

18. A peelable film according to claim 1, wherein when the skin layer is a polymer of butylene and at least one other olefin, the butylene content of the polymer is from 10 to 30 wt. %.

19. A method of making a peelable film comprising coextruding a core layer comprising an olefin polymer with a skin layer consisting essentially of either: (i) a blend of a butylene polymer with another olefin polymer; or (ii) a polymer of butylene with one other olefin; and coating said skin layer with a coating layer comprising a heat-sealable polymer, said peelable film being peelable between said coating layer and said skin layer.

20. A method according to claim 19, wherein said core layer is oriented by stretching in at least one direction.

21. A method according to claim 20, wherein said core layer is biaxially oriented by stretching in a longitudinal and a transverse direction.

22. A method according to claim 19, wherein the core layer is coextruded with the skin layer.

* * * * *

UNITED STATES PATENT AND TRADEMARK OFFICE
CERTIFICATE OF CORRECTION

PATENT NO. : 5,500,265
DATED : March 19, 1996
INVENTOR(S) : Benoit Ambroise et al.

It is certified that error appears in the above-indentified patent and that said Letters Patent is hereby corrected as shown below:

Col. 5, line 53, Claim 8: "propylons or of burylens" should read -- propylene or of butylene --.

Signed and Sealed this

Sixteenth Day of July, 1996

Attest:

BRUCE LEHMAN

Attesting Officer

Commissioner of Patents and Trademarks